Oct. 7, 1924. 1,510,819
C. G. BARTH
METHOD AND MEANS FOR RE-FORMING WHEELS HAVING WORN TREADS AND FLANGES
Filed Sept. 5, 1918   4 Sheets-Sheet 1
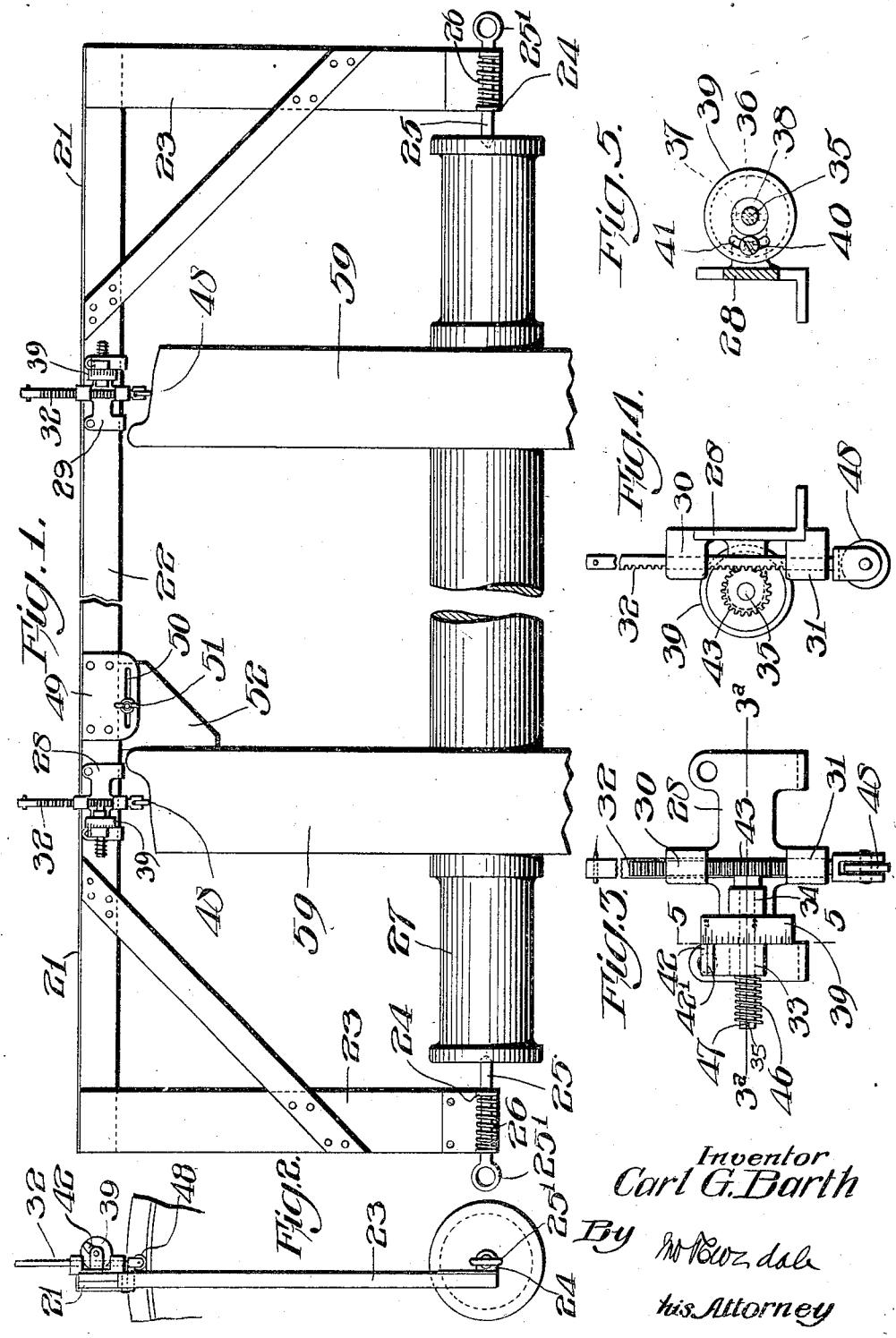
Inventor
Carl G. Barth
By
his Attorney

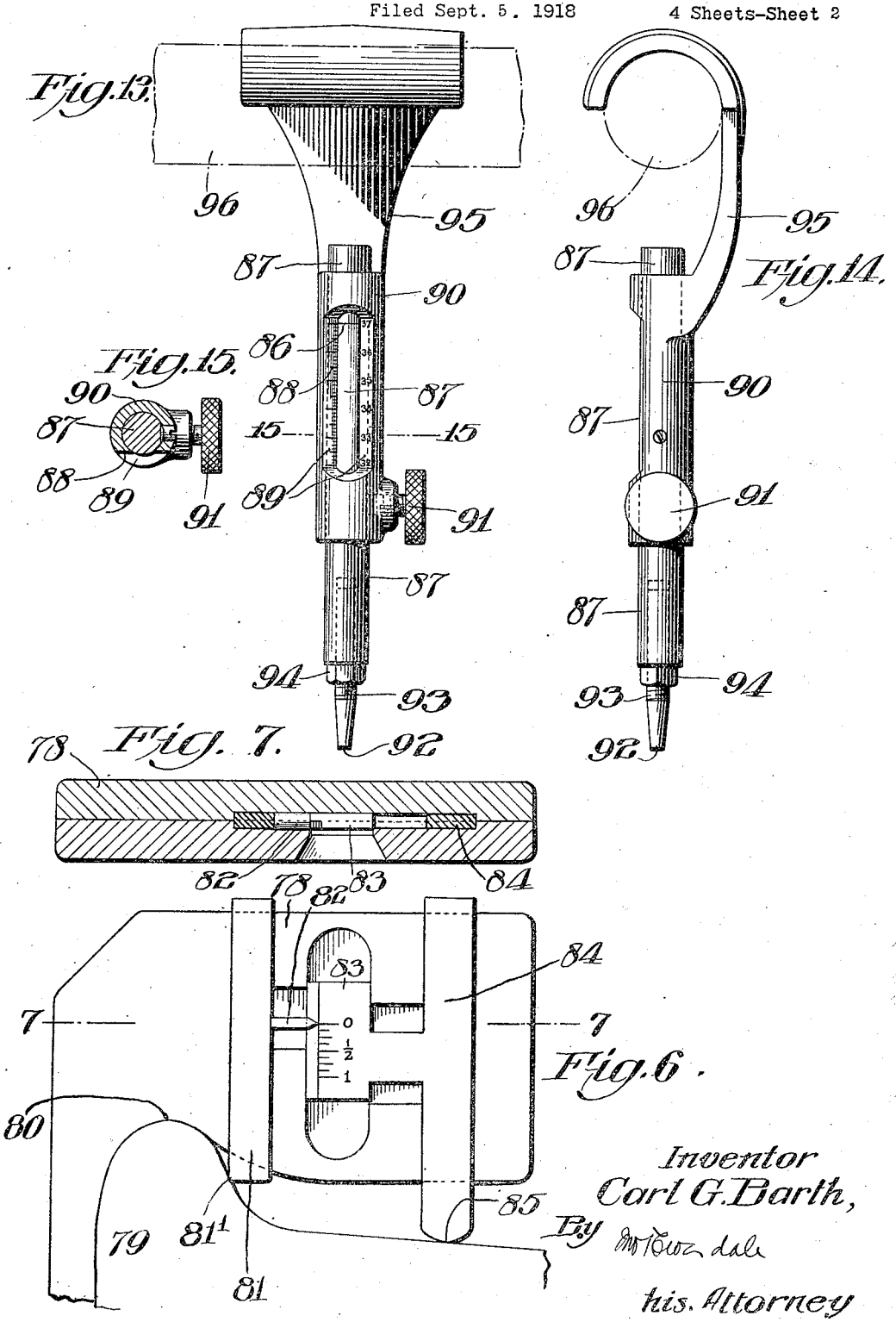

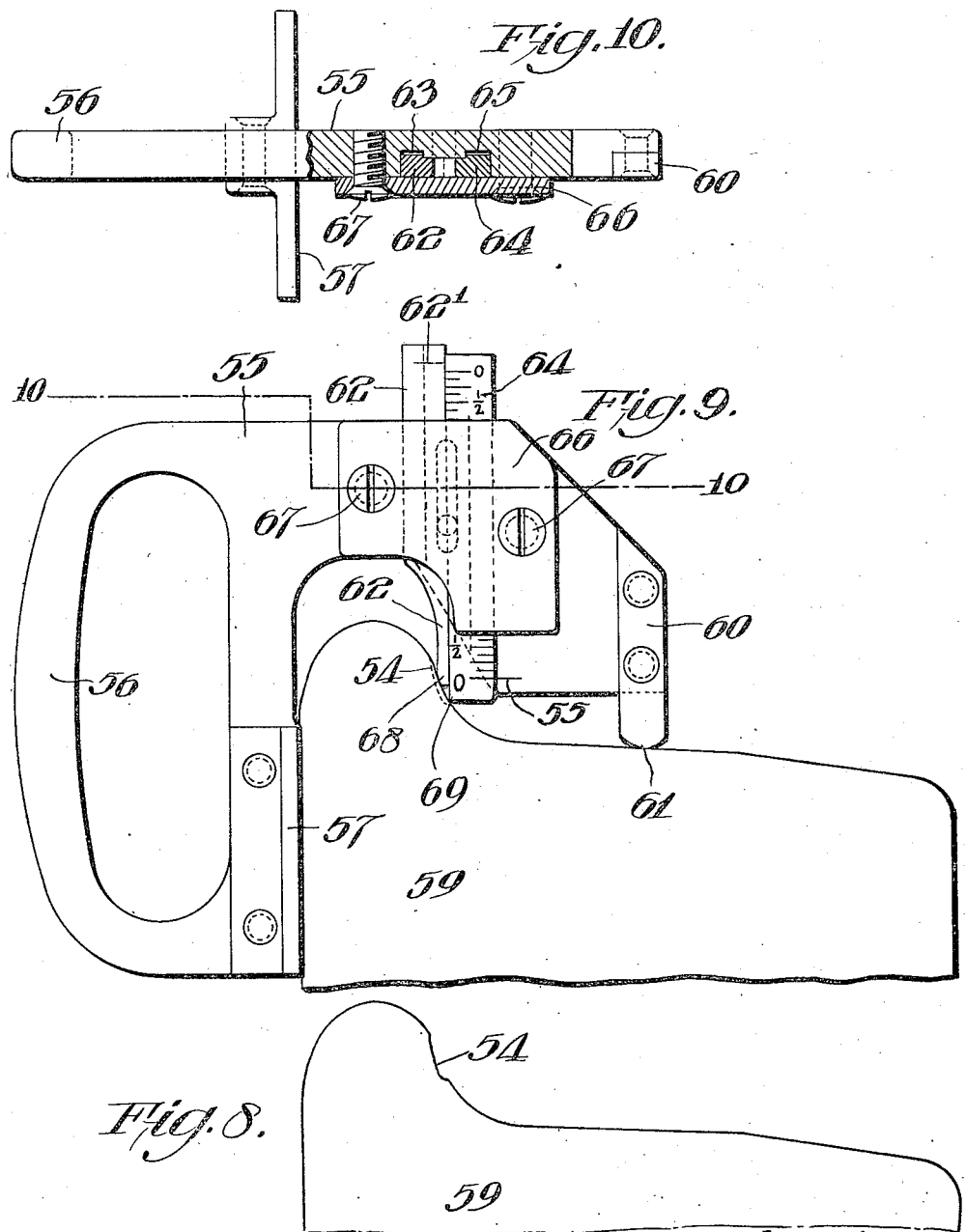

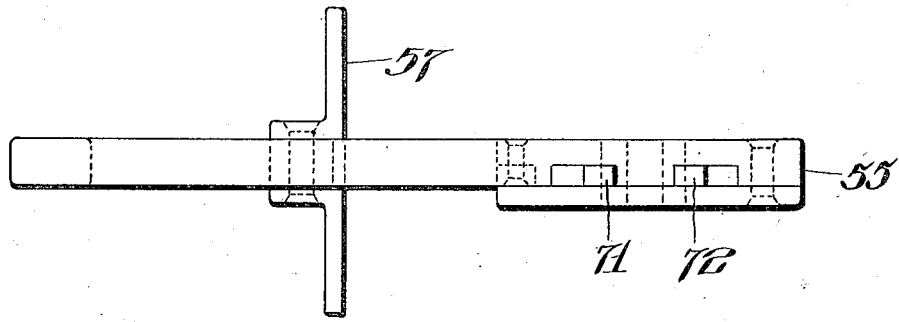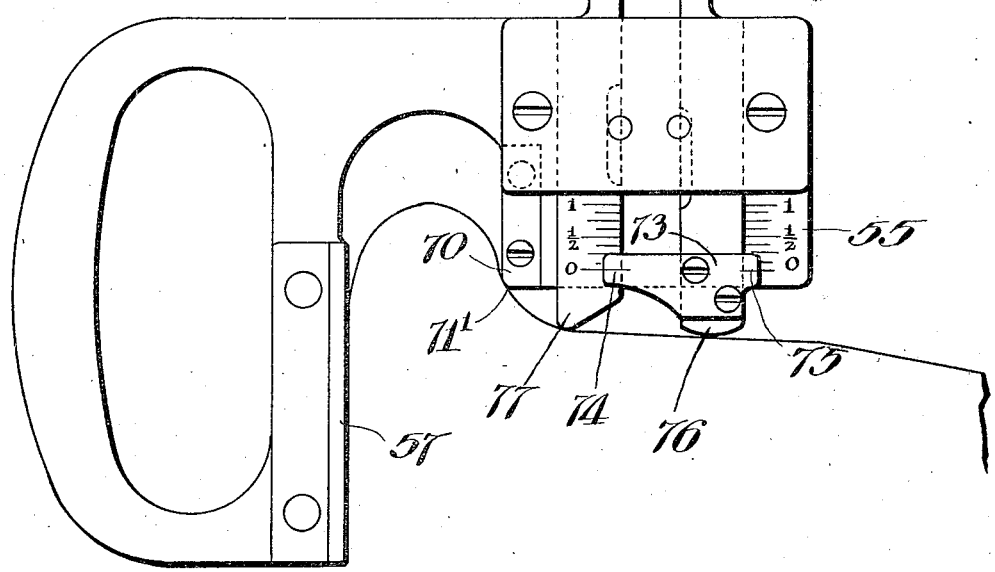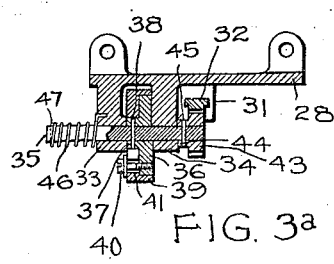

Patented Oct. 7, 1924.

1,510,819

UNITED STATES PATENT OFFICE.

CARL G. BARTH, OF PHILADELPHIA, PENNSYLVANIA.

METHOD AND MEANS FOR RE-FORMING WHEELS HAVING WORN TREADS AND FLANGES.

Application filed September 5, 1918. Serial No. 252,686.

*To all whom it may concern:*

Be it known that I, CARL G. BARTH, a citizen of the United States, residing at Philadelphia, in the county of Philadelphia, State of Pennsylvania, have invented a new and useful Method and Means for Re-Forming Wheels Having Worn Treads and Flanges, of which the following is a specification.

My invention relates to improved methods and means for operating upon car and locomotive wheels that have become worn so that the tread or the flange or both are out of true or the latter dangerously thin. The purpose is to bring said tread and flange back to true formation, and thereby restore the usefulness of the wheel, at minimum cost of labor, and material in the wheel.

The invention comprises methods and means for detecting and measuring (with a view of recording for eventual use) the irregularities in the periphery or tread of worn wheels, and for detecting and measuring defects or inequalities in their flanges, with a view to determine (outside of, or away from the turning lathe) the maximum diameter to which a wheel may be remachined to the required contour of tread and flange; and on the strength of this, so to re-mate a group of worn wheels on their axles (or on others, new or old), so that two wheels of as nearly as possible the same "to-be-remachined diameters," may be mounted on the same axle, so that the final operation of remachining them in the lathe, to exactly the same diameter within the required tolerances, may be done without any appreciable loss of good wearing material on their respective peripheries; and, finally, methods and means for reducing to a minimum, the time required for adjusting the cutting tools for roughing down of a pair of wheels thus re-mated and remounted to the same predetermined maximum possible diameter.

Referring to the drawings, which illustrate merely by way of example, suitable means for the embodiment of my invention:—

Fig. 1 is a fragmentary elevation of the calipering device (tram) for ascertaining the diameter to which the two wheels on an axle have worn down at that point of the tread where, by standard practice, the nominal diameter of a wheel is always measured—the "tread gauge point."

Fig. 2 is a side elevation of same.

Fig. 3 is a front elevation on an enlarged scale of the gauge mechanism.

Fig. 3ª is a horizontal section on line 3ª, 3ª of Fig. 3.

Fig. 4 is a side elevation of same.

Fig. 5 is a section on line 5, 5 of Fig. 3.

Fig. 6 is an elevation of the flange gauge with the covering plate removed.

Fig. 7 is a section on line 7, 7 of Fig. 6.

Fig. 8 is an outline contour of a wheel flange.

Fig. 9 is an elevation of a modification of the flange gauge.

Fig. 10 is a section on line 10, 10 of Fig. 9.

Fig. 11 is an elevation of further modification.

Fig. 12 is a plan view of same.

Fig. 13 is a front elevation of wheel gauge for lathe.

Fig. 14 is a side elevation of same.

Fig. 15 is a section on line 15, 15 of Fig. 13.

Similar numerals refer to similar parts throughout the several views.

Referring to Fig. 1, the frame 21 is provided with the horizontal bar 22 and the vertical extensions 23. At the lower ends of which are provided the brackets 24 forming housings for the center pins 25 provided with operating rings 25' and controlled by the compression springs 26. These pins 25 are adapted to engage the centers of the axle 27 and have a spring controlled movement in the brackets 24.

Mounted on the horizontal bar 22 are the brackets 28 and 29 provided with the gauge mechanism. As these two brackets and gauge mechanism are substantially alike in construction and operation, a description of one will suffice.

The bracket 28 is provided with the two lugs 30 and 31 arranged one vertically above the other and provided with channels for receiving the rack member 32. The bracket is also provided with the two horizontally arranged lugs 33 and 34 forming bearings for the shaft 35. To this shaft 35 is secured the disc 36, Fig. 5, by means of the pin 37 passing through the hub 38 and the shaft Fig. 3ª. Upon this disc is fitted the gauge cylinder 39 and adjustably secured thereto by means of the screw 40 passing through slot 41 and threaded into disc 36. The periphery of cylinder 39, the diameter of which is made just double that of the pitch diameter of pinion 43 Fig. 3ª, is provided with graduations in inches and fractions of inches exactly as an ordinary two foot rule, except that the inch marks do not run from 0 up, but are such as to represent even inches of possible diameters of wheels within the range of the instrument, between a minimum and a maximum.

From lug 33 there is provided a projection 42 which is provided with a line or mark 42' for registering with the graduations on the gauge cylinder 39.

To shaft 35 is also secured the pinion 43 having hub 44, by means of pin 45. This pinion 43 meshes with rack 32 Fig. 4. A spring 46 is connected at one end, as at 47, with shaft 35 and at the other end with the lug 33. On the lower end of rack 32 is provided the contact or gauge wheel 48.

On bar 22 is also secured the bracket 49 provided with the slot 50. To this bracket 49 is adjustably secured, by means of the bolt 51 in said slot 50, the stop block 52.

The operation is as follows:—

When it is desired to caliper or test a pair of wheels to detect and measure the amount of wear of their respective treads, the frame is mounted on the axle 27 with the center pins 25 engaging the axle centers. The block 52 is adjusted against the side face of the wheel to bring the "gauge point" of the tread of the wheel or the tread gage point line beneath the contact wheel 48 of the gauge. Since the wheels and axle are practically integral, this brings the periphery of the other wheel tread similarly in position beneath the other gauge wheel 48. It will also be understood that the cylinders 39 with the graduations, have first been adjusted as above described, so that the proper graduation, corresponding to the wheel's normal diameter, registers with the mark 42' on lug 42 Fig. 3. As the wheels are then rotated in relation to the measuring device by pushing them along the track on which they rest, worn places or depressions on the peripheral tread will be indicated by the contact wheel moving up or down to accommodate itself to said irregularities or unevennesses, and thus the rack and pinion actuation will be indicated by the graduated cylinder with respect to the mark 42'.

As the diameter of the graduated cylinder is twice the diameter of the pinion, the reading will at all times give a diameter equal to double the distance of the point of contact of the gauge wheel 48 with the wheel tread, to the common centre of the axle and the wheel; and hence, when the gauge wheel comes in contact with the most worn portion of an unevenly worn tread of a wheel, the reading will directly indicate the minimum diameter of the wheel at the "tread gauge point." This, determined for each wheel, is then noted and suitably recorded for use later on in connection with the readings made by means of the "flange gauge," now to be described.

Flange gauge.

The next step in preparing for the remachining of the wheel, is to ascertain if the flange of the wheel, which is particularly liable to wear in taking curves, has been worn proportionately more than the tread, so that a further reduction of the diameter of the wheel will be necessary to restore the standard form or contour of the tread and flange, than indicated by merely the preliminary calipering of the more or less irregularly worn tread of the wheel at the "tread gauge point," as previously described.

This is done by means of a gauge provided with one or more "plungers" that, when properly applied to the wheel, adjust themselves so as to indicate, by means of suitably graduated scales, the amount of radial misplacement they receive by being applied to a wheel with a flange and tread contour that have become more or less distorted, relatively to each other, by wear as against being applied to a wheel of standard, unworn shape, or to a stationary point on the gauge which is in contact with a particular point on the contour of the wheel.

In Fig. 6 such a gauge with two plungers and the top point of the flange (which never receives any appreciable wear) as the stationary point, is illustrated placed in correct position against a wheel of correct shape. The end point 85 of the plunger 84 rests on the tread at its "gauge point" the left end point of plunger 81, on the "flange gauge point" 81', and these two gauge points being in correct relation to each other, the pointer 82 on plunger 81, registers with the o point on the graduated scale 83 of plunger 84.

Suppose now that, when placed against a worn contour, both plungers would drop the same amount as compared with their positions against the perfect contour, this would evidently be indicated by the pointer 82 again registering against the o point on scale 83. If, however, the plunger 84 should drop relatively more than plunger 81, this would be indicated by the point 82 taking a position above the graduated scale 83, and this would at once be interpreted to mean that the wear of the flange was so much less than the wear of the tread, that the wheel will be fully restored to perfect contour by returning it to the maximum diameter obtained by the preliminary measurement by means of the calipering device upon the tread. On the other hand, if plunger 81 should drop relatively more than plunger 84, as indicated by the pointer 82 registering a particular reading against scale 83, this would mean that the originally determined maximum tread diameter of the worn wheel would have to be further reduced by the reading on scale 83, to ascertain the maximum diameter to which the wheel may be turned. It happens, to be sure, on rare occasions that the wear of the wheel is such that merely measuring the contour at the two gauge points is not enough, but this happens so seldom, that the gauge just described is a perfectly practical instrument, and that it would not be worth while to complicate it with additional plungers, except when a completely perfect contour is demanded. Some of the leading railroads of the country however, save the extreme removal of useful metal on the wheel tread when the flange is worn badly by permitting a groove in the flange such as shown in Fig. 8; the argument for this being, that a certain perfect portion of the flange only, insures perfect tracking of the wheel, while the groove allowed does not impair the strength of the flange enough to make it liable to break in running over "frogs."

In Fig. 9 is illustrated a gauge in which the "tread gauge point" is selected as the point from which to ascertain whether or not the flange is proportionately worn more than the tread. The gauge is here also shown placed against a correct contour, and the fixed line 55 therefore registers on the o point of the scale at the bottom end of plunger 64, whose left bottom point 69 rests on the "gauge point" of the flange. The auxiliary plunger 62 is made of a length to project a certain small amount beyond plunger 64, which it may drop in addition to the drop of plunger 64 before any cognizance is taken of the scale at the top of this latter, if used for the restoration of a wheel on which the above-mentioned groove in the flange is to be permitted. However, if plunger 62 drops enough relatively to plunger 64, then the readings on both scales of this plunger must be jointly deducted from the minimum diameter of the worn tread as determined by the preliminary calipering first described.

In Figs. 11 and 12 is finally illustrated a flange gauge in which the stationary point coincides with the "flange gauge point". The bottom end point of the main plunger 72 takes its position at the "gauge point" of the tread, and if its line 75 shows below the fixed scale 55 it indicates that the tread of the wheel has been worn more than the flange, and that, hence, the wheel may be restored to perfect contour by remachining it to the originally measured maximum tread diameter. On the other hand, if line 75 gives a reading against scale 55, this reading indicates a proportionately greater wear of the flange, and as such must be deducted from that maximum diameter, to arrive at the maximum diameter to which the wheel may be remachined. The auxiliary plunger 71 measures any wear of the tread at a certain point between its gauge point and the flange that exceeds the wear at the gauge point itself, and which therefore jointly with the former reading must be deducted from the maximum diameter at the tread originally measured by the calipering device. However, as alluded to before it is of no use in the majority of cases, and left out, leaves a perfectly practical instrument.

It will now be realized that numerous plungers may be arranged, and by providing suitable scales on which to read off their relative relations to each other, or to each other and a stationary point on the gauge, any unusual and abnormal wear might be ascertained and allowed for.

It might be explained right here that the car wheel is provided with a tire of high carbon steel. This tire is originally made of a certain thickness, and a mark is made on the side of the tire indicating the point or line to which the wheel may wear with safety—the limit of wear line. When this line is passed the usefulness of the wheel has come to an end. The space between the original diameter of the wheel and this limit of wear line, is the measure of the metal that may be worn or cut from the wheel to keep it true. The number of times that the wheel can be reformed is consequently a factor in the life of the wheel, and the number of times the wheel can be reformed depends to a very great extent upon the elimination of waste or unnecessary cutting. To eliminate all waste or unnecessary cutting will result in the saving of many thousands of dollars per year. Hence the value of the present invention may readily be appreciated.

It will be understood that, by deducting the readings taken by any of these flange gauges, from the reading made of the minimum diameter of the wheel at the "tread gauge point" as ascertained by means of the calipering device first described, the maximum diameter to which the wheel may be remachined, is obtained. This maximum diameter is then recorded in some suitable manner, together with that of others in a group, to enable them all to be properly remated and remounted, so that the wheels of approximately the same "maximum" possible perfect diameter may be mounted on the same axle, and restored to service after being remachined to such maximum diameter, in a suitable lathe.

Having now described the methods and means for ascertaining the common diameter to which a pair of remounted wheels are to be remachined, two different methods and means for reducing to a minimum the time required in adjusting the roughing tools of the turning lathe in which this is to be done, will be described.

In Figs. 13, 14 and 15, I show a modification of a gauge extensively used in wheel turning; my modification consisting in arranging it with graduation by means of which the length of the gauge may be so adjusted that, when mounted and swung upon its supporting bar 96 of the wheel lathe, its end point 92 will be exactly the predetermined radius of the wheels to be remachined distant from the center line of the lathe. The whole arrangement is such that the proper adjustment of the gauge is obtained by merely setting the marker line 86 of the slidable plunger bar 87 against the predetermined diameter to which the wheels are to be re-turned, as read off on the graduated scale 88 on the frame 90 of the gauge, Figs. 13 and 14. The sub-adjustment of point 92 by means of its thread 93 and the lock nut 94, has been provided to facilitate the adjustment of the whole instrument to correct reading in the first place, and to enable a readjustment to be made at any time that appreciable wear of the point 92 or of the upper suspension hook-bearing 95 of the frame might call for it.

The gauge as now in common use has no graduation and sub-adjustment of the point, and serves merely as a better means than a pair of ordinary calipers, of insuring that the two wheels may be returned to a common diameter, but not to a common "predetermined maximum possible diameter".

What I claim is:

1. The method in connection with re-turning car and locomotive wheels, which comprises the following steps, first locating and measuring the minimum diameter to which the wheel has worn on the tread gauge line, measuring the radial wear on the flange adjacent and relative to the point of maximum wear on the tread previously determined, in order to ascertain the maximum diameter that may be preserved in securing the required re-formation of the wheel.

2. Means for ascertaining the maximum diameter that may be preserved in securing the required re-formation of car and locomotive wheels, comprising means having contact elements radially movable with respect to the wheel when said elements are in operative position with relation to the wheel and adapted for simultaneous engagement respectively with the point of maximum wear on the tread and the adjacent point of maximum wear on the flange of said wheel, and means for indicating the degree of relative movement of one contact element with respect to the other.

3. Means for measuring variations from normal on the tread gauge line of wheels while the same are rolled upon the track, comprising a frame adjustably supported by spring controlled pins engaging the axle centers, said frame being provided with indicating devices having contact elements adapted to follow the tread gauge line as the wheels rotate.

4. Means for measuring variations from normal on the tread gauge line of wheels while the same are rolled upon the track, comprising a frame supported on the axle centers and provided with indicating devices having contact elements adapted to follow the tread gauge line as the wheels rotate, and means for variably positioning the frame simultaneously to adjust the contact elements with respect to each tread gauge line of a pair of wheels.

CARL G. BARTH.